(12) United States Patent
Kim

(10) Patent No.: US 11,926,330 B2
(45) Date of Patent: Mar. 12, 2024

(54) DEVICE FOR DETERMINING ACCIDENT OF PERSONAL MOBILITY, SYSTEM INCLUDING THE SAME, AND METHOD FOR DETERMINING ACCIDENT OF PERSONAL MOBILITY

(71) Applicants: HYUNDAI MOTOR COMPANY, Seoul (KR); KIA CORPORATION, Seoul (KR)

(72) Inventor: So Jeong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 320 days.

(21) Appl. No.: 17/459,723

(22) Filed: Aug. 27, 2021

(65) Prior Publication Data

US 2022/0097716 A1 Mar. 31, 2022

(30) Foreign Application Priority Data

Sep. 28, 2020 (KR) .................. 10-2020-0126261

(51) Int. Cl.
| | |
|---|---|
| *B60W 40/12* | (2012.01) |
| *B60R 21/013* | (2006.01) |
| *B60T 7/22* | (2006.01) |
| *B60W 50/14* | (2020.01) |
| *G08G 1/01* | (2006.01) |
| *G08G 1/16* | (2006.01) |
| *H04M 1/72424* | (2021.01) |
| *H04W 4/029* | (2018.01) |
| *H04W 4/44* | (2018.01) |

(Continued)

(52) U.S. Cl.
CPC ........... *B60W 40/12* (2013.01); *B60R 21/013* (2013.01); *B60T 7/22* (2013.01); *B60W 50/14* (2013.01); *G08G 1/0112* (2013.01); *G08G 1/164* (2013.01); *H04M 1/72424* (2021.01); *H04W 4/029* (2018.02); *H04W 4/44* (2018.02); *H04W 4/90* (2018.02); *B60R 2021/01345* (2013.01); *B60W 2050/143* (2013.01); *B60W 2530/00* (2013.01)

(58) Field of Classification Search
CPC ......... B60W 40/12; B60W 50/14; B60T 7/22; B60R 21/013; B60R 2021/01345; H04W 4/029; H04W 4/44; H04W 4/90
See application file for complete search history.

(56) References Cited

U.S. PATENT DOCUMENTS

| | | | |
|---|---|---|---|
| 2014/0156157 A1* | 6/2014 | Johnson | .................... B60T 7/22 701/70 |
| 2017/0251346 A1* | 8/2017 | Lee | ......................... H04W 4/90 |
| 2019/0232907 A1* | 8/2019 | Lin | ....................... G08B 25/016 |

FOREIGN PATENT DOCUMENTS

| | | | | |
|---|---|---|---|---|
| KR | 20100072513 | A | * | 5/2010 |
| KR | 20190054005 | A | * | 5/2013 |

* cited by examiner

*Primary Examiner* — George C Jin
(74) *Attorney, Agent, or Firm* — MORGAN, LEWIS & BOCKIUS LLP

(57) ABSTRACT

A device for determining an accident of personal mobility in real time, a system for rapidly identifying and coping with the accident, and a method for determining the accident of the personal mobility are provided. The device includes a sensor device that obtains at least one of an angle between the personal mobility and a ground, an amount of impact on the personal mobility, or a speed of the personal mobility, and a determination device that determines whether the accident of the personal mobility has occurred based on the at least one of the angle, the amount of impact, or the speed.

15 Claims, 10 Drawing Sheets

(51) Int. Cl.
*H04W 4/90* (2018.01)
*B60R 21/0134* (2006.01)

DEVICE FOR DETERMINING ACCIDENT OF PERSONAL MOBILITY, SYSTEM INCLUDING THE SAME, AND METHOD FOR DETERMINING ACCIDENT OF PERSONAL MOBILITY

CROSS-REFERENCE TO RELATED APPLICATION

This application claims the priority to and the benefit of Korean Patent Application No. 10-2020-0126261, filed on Sep. 28, 2020, the entire contents of which are incorporated herein by reference.

TECHNICAL FIELD

The present disclosure relates to a device for determining an accident of personal mobility, a system including the same, and a method for determining the accident of the personal mobility.

BACKGROUND

Personal mobility is single-person mobility means powered by electricity, which includes an electric kickboard, an electric wheel, an electric bicycle, a micro electric vehicle, and the like. Under the Korean Road Traffic Act, motors with an engine displacement of less than 50 cc (with a rated output of less than 0.59 kw (590 w) in case of electric power) such as the electric kickboard, the electric wheel, and the like are classified as 'motorcycles'. Thus, a motorcycle license (available from 16 years of age or older) must be carried.

The personal mobility is being provided to the public as a shared personal mobility service. Recently, a shared personal mobility business has been greatly expanded, so that the personal mobility may be viewed on the street without difficulty.

Such personal mobility has a high risk of injury when an accident occurs because there is no protective device for a user. Nevertheless, there is no way to determine whether the accident has occurred except for a customer report. In other words, it is difficult to identify in real time information on the injury or a device damage caused by the accident.

There is a trend of increasing reports on the accidents of the personal mobility. Therefore, to prevent the accidents, it is important for the user to be cautious for oneself when boarding the personal mobility, but there is a need of a system design for accident response in a side of the personal mobility service.

SUMMARY

An aspect of the present disclosure provides a device for determining an accident of personal mobility, a system including the same, and a method for determining the accident of the personal mobility.

Another aspect of the present disclosure provides a device and a method for determining an accident of personal mobility that sense a speed, a tilt, and an impact of the personal mobility to determine the accident of the personal mobility.

Another aspect of the present disclosure provides a device and a method for determining an accident of personal mobility that determine whether a brake of the personal mobility is operating to determine a degree of the accident.

Another aspect of the present disclosure provides a device and a method for determining an accident of personal mobility that determine whether the accident of the personal mobility has occurred and reflect an intention of a user about the accident through a human machine interface (HMI).

Another aspect of the present disclosure provides a device and a method for determining an accident of personal mobility that determine whether the accident of the personal mobility has occurred, output at least one of an alarm or an accident guide when it is determined that the accident has occurred, and stop driving of the personal mobility after a certain period of time.

Another aspect of the present disclosure provides a system and a method for notifying an accident of personal mobility in real-time that determine the accident of the personal mobility, select the personal mobility as an emergency maintenance target when it is determined that the accident has occurred, and display at least one of the accident of the personal mobility or a location of the personal mobility on an administrator application.

Another aspect of the present disclosure provides a system and a method for notifying an accident of personal mobility in real-time that determine the accident of the personal mobility, and provide information of at least one of the accident of the personal mobility or a location of the personal mobility to at least one of an insurance company or a police station when it is determined that the accident has occurred.

Another aspect of the present disclosure provides a system and a method for notifying an accident of personal mobility in real-time that determine the accident of the personal mobility, provide a pop-up notification for making a call to an insurance company or a police station on a user application, and automatically notify the insurance company or the police station that a user is in danger when there is no response to the pop-up notification.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for determining an accident of personal mobility includes a sensor device disposed in the personal mobility and obtaining at least one of an angle between the personal mobility and a ground, an amount of impact on the personal mobility, or a speed of the personal mobility, and a determination device that determines whether the accident of the personal mobility has occurred based on the at least one of the angle, the amount of impact, or the speed.

In one implementation, the determination device may be activated by determining whether the personal mobility is operating based on the speed.

In one implementation, the determination device may determine whether the personal mobility is in a stationary state based on a decrease degree of the speed to determine whether the accident has occurred.

In one implementation, the determination device may determine whether the accident has occurred based on whether the personal mobility and the ground fall within a range of being determined to be horizontal with each other.

In one implementation, the sensor device may determine whether a brake of the personal mobility is operating, and the determination device may determine a degree of the accident based on whether the brake is operating.

In one implementation, the device may further include a human machine interface (HMI) disposed in the personal mobility and receiving confirmation on whether the accident has occurred from a user, and the determination device may re-determine whether the accident has occurred based on the confirmation result from the HMI.

In one implementation, the determination device may be disposed in the personal mobility, and output at least one of an alarm or a guide for the accident displayed on a display of the personal mobility when it is determined by the determination device that the accident of the personal mobility has occurred.

In one implementation, the determination device may stop driving of the personal mobility when a certain time elapses after outputting the at least one of the alarm or the guide for the accident.

According to another aspect of the present disclosure, a system for notifying an accident of personal mobility in real-time includes a personal mobility accident determining device that determines the accident of the personal mobility based on at least one of an angle between the personal mobility and a ground, an amount of impact on the personal mobility, or a speed of the personal mobility, and a control system that selects the personal mobility as an emergency maintenance target when it is determined that the accident has occurred in the personal mobility accident determining device.

In one implementation, the system may further include a global positioning system (GPS) device disposed in the personal mobility and obtaining location information of the personal mobility, and an administrator application for displaying a notification of a content including at least one of information determining the accident or the location information when it is determined by the personal mobility accident determining device that the accident has occurred.

In one implementation, the system may further include a GPS device disposed in the personal mobility and obtaining location information of the personal mobility, and the control system may provide information including at least one of information determining the accident or the location information to at least one of an insurance company or a police station when it is determined by the personal mobility accident determining device that the accident has occurred.

In one implementation, the system may further include a user application for providing a pop-up notification for making a call to the insurance company or the police station when it is determined by the personal mobility accident determining device that the accident has occurred, and the control system may provide information indicating that a user is in danger to at least one of the insurance company or the police station when the user does not respond to the pop-up notification for a certain time.

According to another aspect of the present disclosure, a method for determining an accident of personal mobility includes obtaining at least one of an angle between the personal mobility and a ground, an amount of impact on the personal mobility, or a speed of the personal mobility, determining whether the accident of the personal mobility has occurred based on the at least one of the angle, the amount of impact, or the speed, receiving confirmation on whether the accident has occurred from a user through an HMI disposed in the personal mobility, and re-determining whether the accident has occurred based on the confirmation result from the HMI.

In one implementation, the method may further include outputting at least one of an alarm or a guide for the accident displayed on a display of the personal mobility when it is determined that the accident of the personal mobility has occurred, and stopping driving of the personal mobility when a certain time elapses after outputting the at least one of the alarm or the guide for the accident.

In one implementation, the method may further include obtaining location information of the personal mobility, and providing information including at least one of information determining the accident or the location information to at least one of an insurance company or a police station when it is determined that the accident has occurred.

DRAWINGS

The above and other objects, features and advantages of the present disclosure will be more apparent from the following detailed description taken in conjunction with the accompanying drawings.

DETAILED DESCRIPTION

Figure 1:
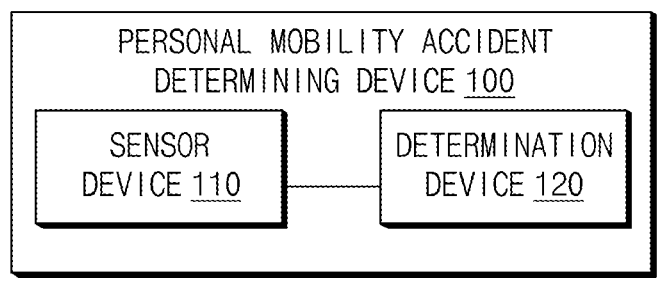
FIG. 1 is a block diagram of a personal mobility accident determining device in one form of the present disclosure.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, some forms of the present disclosure will be described in detail with reference to FIGS. 1 to 10.

FIG. 1 is a block diagram of a personal mobility accident determining device in some forms of the present disclosure.

Referring to FIG. 1, a personal mobility accident determining device 100 in some forms of the present disclosure may be implemented including a sensor device 110 and a determination device 120.

The sensor device 110 may be disposed in personal mobility, and may include a component for obtaining at least one of an angle between the personal mobility and the ground, an amount of impact on the personal mobility, or a speed of the personal mobility.

The sensor device 110 may determine whether a brake of the personal mobility is operating.

The determination device 120 may be connected to the sensor device 110 in a wireless or wired manner.

As an example, the determination device 120 may be connected to the sensor device 110 such that communication therebetween is possible, and receive sensed information from the sensor device 110.

The determination device 120 may be disposed in the personal mobility or may be separated from the personal mobility.

When the determination device 120 is separated from the personal mobility, the determination device 120 may be connected to the sensor device 110 through separate communication means.

The determination device 120 may determine whether an accident of the personal mobility has occurred based on at least one of the angle between the personal mobility and the ground, the amount of impact on the personal mobility, or the speed of the personal mobility obtained from the sensor device 110.

As an example, the determination device 120 may be activated by determining whether the personal mobility is operating based on the speed.

For example, the determination device 120 may determine whether the accident has occurred by determining whether the personal mobility is stopped based on a decrease degree of the speed.

For example, the determination device 120 may determine whether the accident of the personal mobility has occurred based on whether the personal mobility and the ground fall within a range of being determined to be horizontal with each other.

For example, the determination device 120 may determine a degree of the accident based on whether the brake of the personal mobility is operating.

Figure 2:
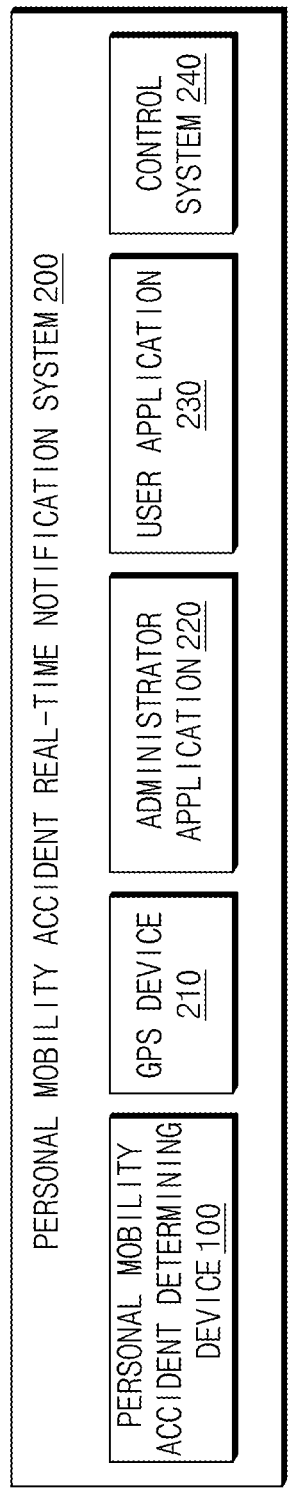
FIG. 2 is a block diagram of a personal mobility accident real-time notification system in one form of the present disclosure.

FIG. 2 is a block diagram of a personal mobility accident real-time notification system in some forms of the present disclosure.

Referring to FIG. 2, a personal mobility accident real-time notification system 200 may be implemented including the personal mobility accident determining device 100, a global positioning system (GPS) device 210, an administrator application 220, a user application 230, and a control system 240.

The personal mobility accident determining device 100 may be a component for determining the accident of the personal mobility based on at least one of the angle between the personal mobility and the ground, the amount of impact on the personal mobility, or the speed of the personal mobility.

The personal mobility accident determining device 100 may be directly or indirectly connected to at least one of the administrator application 220, the user application 230, or the control system 240 in the wireless or wired manner to provide information obtained by determining the accident of the personal mobility.

The GPS device 210 may be a device that is disposed in the personal mobility and obtains location information of the personal mobility.

For example, the GPS device 210 may be implemented as a device that receives a signal sent from a GPS satellite and calculates a current location of the personal mobility.

The GPS device 210 may be directly or indirectly connected to at least one of the administrator application 220, the user application 230, or the control system 240 in the wireless or wired manner to provide information on the location of the personal mobility.

For example, the GPS device 210 may be connected to the control system 240 in the wireless or wired manner to directly provide the information on the location of the personal mobility. The administrator application 220 or the user application 230 may receive the location information obtained from the GPS device 210 indirectly through the control system 240.

As another example, the GPS device 210 may be connected to the control system 240, the administrator application 220, and the user application 230 in the wireless or wired manner to directly transmit the information on the location.

The administrator application 220 may be an application that manages an overall personal mobility service.

For example, the administrator application 220 may be installed in a form of software on an electronic device. The administrator application 220 may be installed on an electronic device including a communication terminal, but may not be limited thereto.

For example, the administrator application 220 may be software installed on a smartphone, and may output a push notification to the smartphone.

When it is determined in the personal mobility accident determining device 100 that the accident has occurred, the administrator application 220 may display a notification on at least one of the information obtained by determining the accident of the personal mobility or the location information of the personal mobility. The notification on the information obtained by determining the accident of the personal mobility or the location information of the personal mobility may be displayed as a text, a picture indicating a location on a map, or the like.

The user application 230 may be an application installed on an electronic device of a user using the personal mobility service.

For example, the user application 230 may be installed in the form of the software on the electronic device of the user. The user application 230 may be installed in the electronic device including the communication terminal, but may not be limited thereto.

For example, the user application 230 may be the software installed on the smartphone, and may output a pop-up notification on the smartphone.

When it is determined in the personal mobility accident determining device 100 that the accident has occurred, the user application 230 may provide a pop-up notification for making a call to an insurance company or a police station.

The control system 240 may be a system for comprehensively managing and controlling the personal mobility services. The control system 240 may be implemented including one or more hardware or software.

The control system 240 may determine whether the personal mobility (PM) service is insured, and may be implemented to communicate with the insurance company and the police station.

The control system 240 may select the personal mobility determined, by the personal mobility accident determining device 100, to have the accident as an emergency maintenance target.

Hereinafter, with reference to FIG. 3, the sensor device 110 that obtains information for determining, by the personal mobility accident determining device 100, the accident of the personal mobility will be described in detail.

Figure 3:
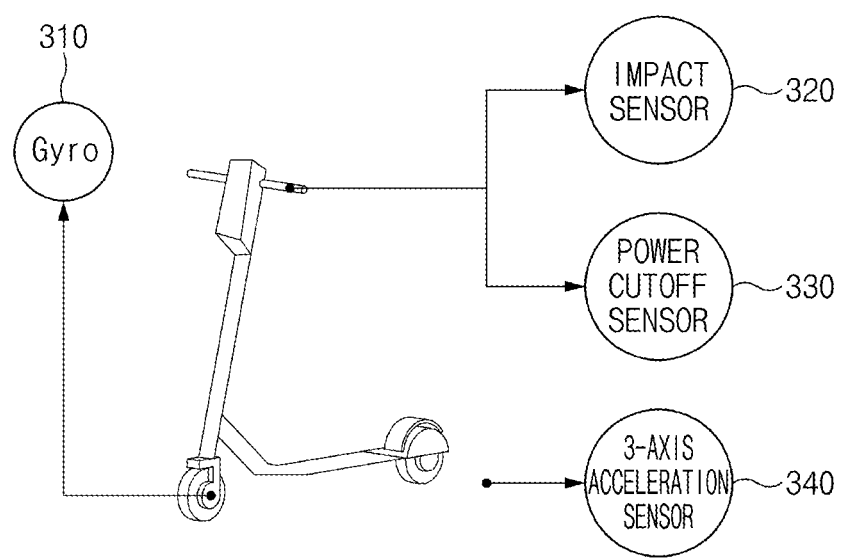
FIG. 3 is a diagram for illustrating a sensor device disposed in personal mobility in one form of the present disclosure.

FIG. 3 is a diagram for illustrating the sensor device 110 disposed in the personal mobility in some forms of the present disclosure.

The personal mobility may include the sensor device 110.

The sensor device 110 may include at least one of a gyro sensor 310, an impact sensor 320, a power cutoff sensor 330, or a 3-axis acceleration sensor 340.

The gyro sensor 310 may be disposed on each of a head and a front wheel of the personal mobility, and may sense an angular speed of each of the head and the front wheel.

The gyro sensor 310 may determine horizontality/verticality of the personal mobility.

For example, the gyro sensor 310 may sense an angle between the personal mobility and a road through an axis, and an angle of the personal mobility itself.

The impact sensor 320 may be disposed on a handle of the personal mobility, and may sense an amount of impact on the handle.

The power cutoff sensor 330 may be disposed on the handle of the personal mobility, and may control a driving power of the personal mobility in response to the operation of the brake.

As an example, the power cutoff sensor 330 may reduce the speed or cut off power of a battery to prevent a safety accident.

The 3-axis acceleration sensor 340 may be disposed on the personal mobility and identify information on the speed and a tilt of the personal mobility.

The 3-axis acceleration sensor 340 may measure acceleration in x-axis, y-axis, and z-axis directions set in the personal mobility to determine a tilted angle of the personal mobility.

For example, the 3-axis acceleration sensor 340 may determine whether the device is currently operating (whether the service is activated) based on the speed of the personal mobility.

As an example, the 3-axis acceleration sensor 340 may identify a tilted state of the personal mobility.

Hereinafter, with reference to FIG. 4, the personal mobility accident real-time notification system 200 including the personal mobility accident determining device 100 will be described in detail.

Figure 4:
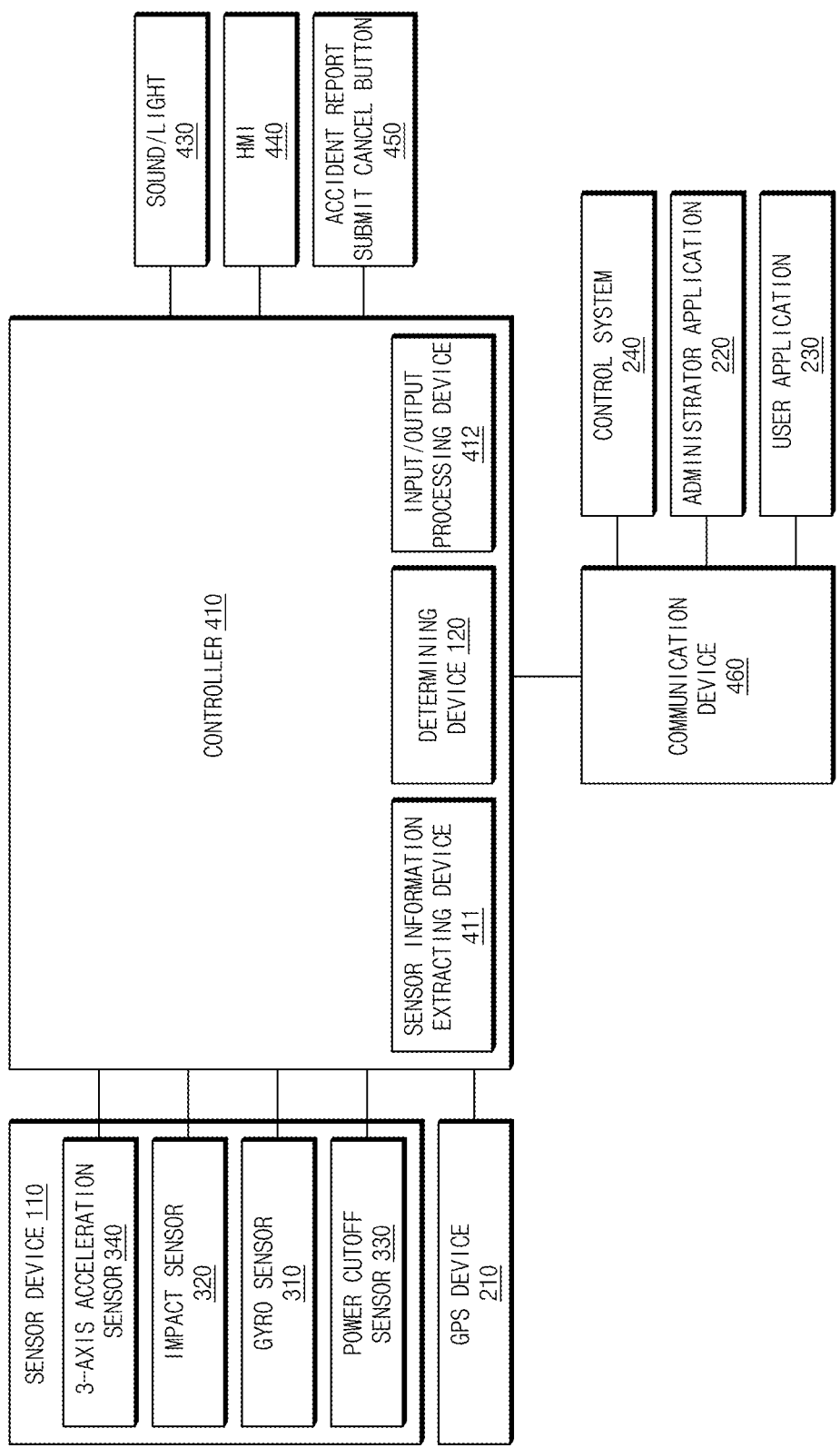
FIG. 4 is a block diagram for specifically illustrating a personal mobility accident real-time notification system in one form of the present disclosure.

FIG. 4 is a block diagram for specifically illustrating a personal mobility accident real-time notification system in some forms of the present disclosure.

A controller 410 may be disposed in the personal mobility, and may electrically control each component of the personal mobility. Further, the controller 410 may perform processing, calculation, and the like of various data to be described below.

The controller 410 may be integrally formed with control units of the personal mobility, or may be implemented as a separate device and connected to the control units of the personal mobility by separate connection means or communication means.

Referring to FIG. 4, the controller 410 may be implemented including a sensor information extracting device 411, the determination device 120, and an input/output processing device 412.

The controller 410 may be connected to the gyro sensor 310, the impact sensor 320, the power cutoff sensor 330, and the 3-axis acceleration sensor 340 included in the sensor device 110 in the wired or wireless manner.

The sensor information extracting device 411 may extract the information sensed from the gyro sensor 310, the impact sensor 320, the power cutoff sensor 330, and the 3-axis acceleration sensor 340 connected to the controller 410.

The input/output processing device 412 may process information input to the controller 410 and information output from the controller 410 through the processing or the calculation of the various data.

The controller 410 may be connected to the GPS device 210 in the wireless or wired manner.

The controller 410 may be connected to a sound/light 430, an HMI 440, and an accident report cancel button 450 in the wireless or wired manner to electrically control each component.

The sound/light 430 may be disposed on the personal mobility, and may output warning sound or warning light.

The human machine interface (HMI) 440 may be implemented as an interface for connecting the user and the personal mobility device with each other.

The HMI 440 may convert data used for machine control into a form familiar to the user who is human, and convert data input from the user into data used for the machine control.

The accident report cancel button 450 may receive an intention of the user in a process of receiving confirmation on the accident from the user.

As an example, the accident report cancel button 450 may be implemented as a button displayed on a touch screen of the HMI 440 and may receive the intention of the user.

When the accident report cancel button 450 is pressed, the controller 410 may determine that the user has input an intention of not wanting to report the accident.

When the accident report cancel button 450 is pressed within a certain time, the controller 410 may determine that no accident has occurred. Further, when the accident report cancel button 450 is not pressed within the certain time, the controller 410 may determine that the accident has occurred.

The controller 410 may be electrically connected to a communication device 460. The communication device 460 may include a communication module supporting a communication interface with the control system 240, the administrator application 220, and the user application 230.

Hereinafter, with reference to FIG. 5, the process in which the personal mobility accident determining device 100 determines the accident will be described in detail.

Figure 5:
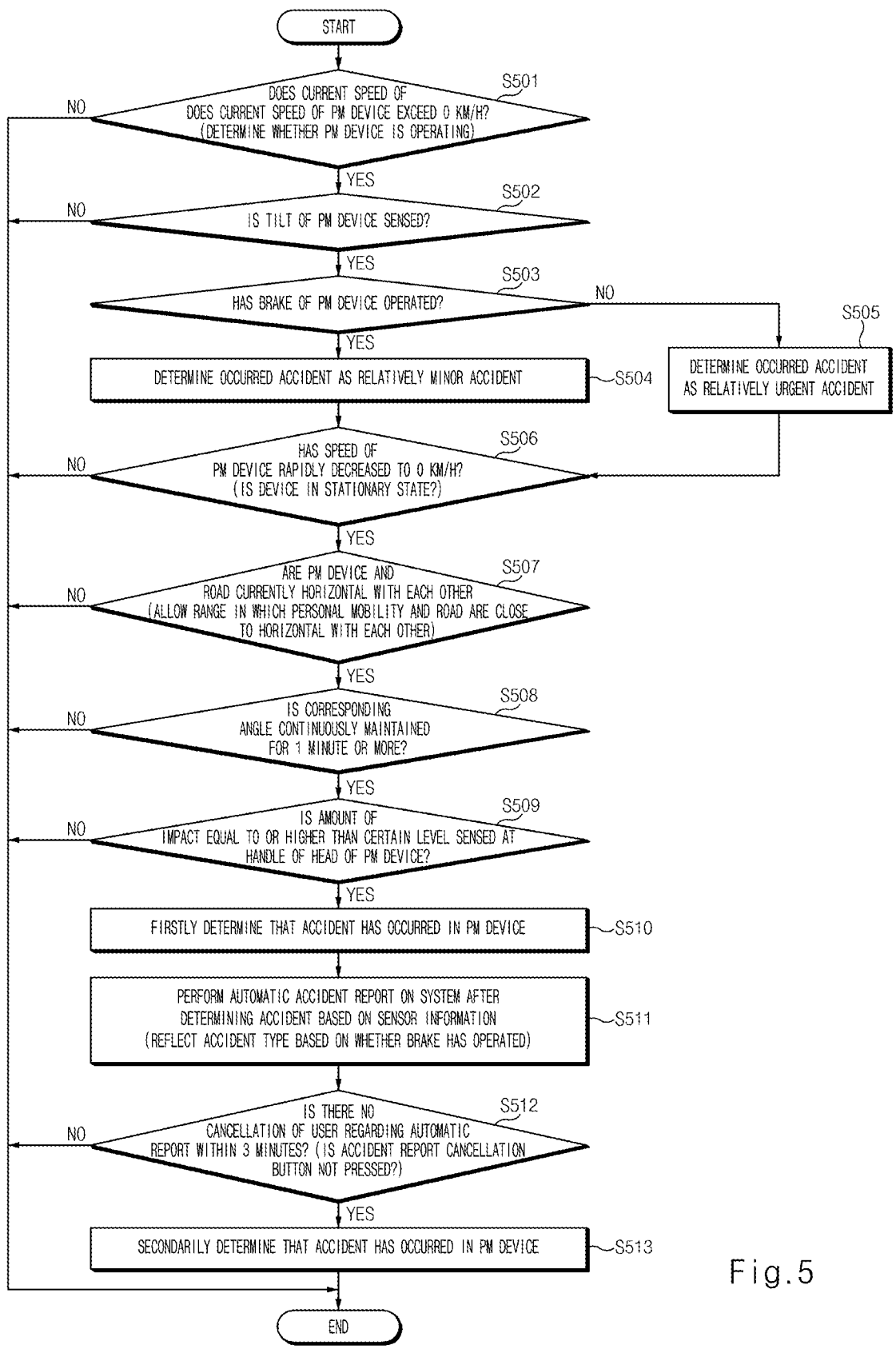
FIG. 5 is a flowchart for illustrating an operation of a personal mobility accident determining device in one form of the present disclosure.

FIG. 5 is a flowchart for illustrating an operation of a personal mobility accident determining device in some forms of the present disclosure.

First, the personal mobility accident determining device 100 may determine whether the speed of the personal mobility obtained through the sensor device 110 exceeds 0 km/h (S501).

When the speed of the personal mobility exceeds 0 km/h, the personal mobility accident determining device 100 may determine that the personal mobility is operating (the service is being provided).

When the speed of the personal mobility exceeds 0 km/h, the personal mobility accident determining device 100 may determine whether the tilt of the personal mobility is sensed (S502).

The tilt of the personal mobility may be obtained through the gyro sensor 310 or the 3-axis acceleration sensor 340.

When the tilt of the personal mobility is sensed, the personal mobility accident determining device 100 may determine whether the brake of the personal mobility has operated (S503).

The personal mobility accident determining device 100 may determine whether the brake of the personal mobility has operated through the power cutoff sensor 330.

When the brake of the personal mobility has operated, the personal mobility accident determining device 100 may identify that the accident has occurred in a state in which the speed of the personal mobility has decreased, and determine the occurred accident as a relatively minor accident (S504). On the other hand, when the brake of the personal mobility has not operated, the personal mobility accident determining device 100 may identify that the accident has occurred in a state in which the speed of the personal mobility has not decreased, and determine the occurred accident as a relatively urgent accident (S505).

The personal mobility accident determining device 100 may determine whether the speed of the personal mobility has rapidly decreased to 0 km/h (S506).

When the speed of the personal mobility decreases to 0 km/h, the personal mobility accident determining device 100 may determine that the personal mobility is in a stationary state.

The speed of the personal mobility may be determined using information obtained through the power cutoff sensor 330 or the 3-axis acceleration sensor 340.

When the speed of the personal mobility has rapidly decreased to 0 km/h, the personal mobility accident determining device 100 may determine whether the personal mobility and the road are horizontal with each other (S507).

For example, the personal mobility accident determining device 100 may determine whether the personal mobility and the road fall within the range in which the personal mobility and the road are close to horizontal with each other, and thus, determined to be horizontal with each other. The personal mobility and the road are impossible to be completely horizontal with each other due to the handle of the personal mobility, so that when the angle therebetween is within the certain angle range, the personal mobility and the road may be determined to be horizontal with each other.

When it is determined that the personal mobility and the road are horizontal with each other, the personal mobility accident determining device 100 may determine whether the corresponding angle is continuously maintained for 1 minute or more (S508).

For example, when the corresponding angle is maintained for 1 minute or more, the personal mobility accident determining device 100 may determine that the personal mobility is not standing after the personal mobility has fallen.

It is only one example that a reference time is 1 minute. The personal mobility accident determining device 100 may determine whether the corresponding angle is maintained for a different reference time that is other than 1 minute.

When it is determined that the corresponding angle is maintained for more than 1 minute, the personal mobility accident determining device 100 may determine whether an amount of impact equal to or higher than a certain level is sensed at the handle of the head of the personal mobility (S509).

The amount of impact on the handle of the head may be obtained from the impact sensor 320.

When it is determined that the amount of impact of equal to or higher than the certain level is applied to the handle of the head of the personal mobility, the personal mobility accident determining device 100 may firstly determine that the accident has occurred in the personal mobility device (S510).

The personal mobility accident determining device 100 may perform automatic accident report on a system after determining the accident based on the sensor information (S511).

When it is determined that the accident has occurred, the personal mobility accident determining device 100 may perform the accident report to the control system 240.
A. The personal mobility accident determining device 100 may perform the report by reflecting an accident type based on whether the brake has operated in the process of performing the automatic accident report.

The personal mobility accident determining device 100 may determine whether there is no cancellation of the user regarding the automatic report within 3 minutes (S512).

The personal mobility accident determining device 100 may determine whether there is the cancellation of the user through the HMI 440 or the accident report cancel button 450.

It is only one example that the reference time is 3 minutes. The personal mobility accident determining device 100 may determine whether there is no cancellation of the user regarding the automatic accident report within a different reference time that other than 3 minutes.

When there is no cancellation of the user regarding the automatic report within 3 minutes, the personal mobility accident determining device 100 may secondarily determine that the accident has occurred in the personal mobility device (S513).

Figure 6:
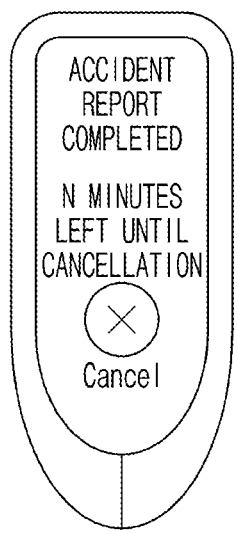
FIG. 6 is a diagram for illustrating a specific example of receiving confirmation on whether an accident has occurred from a user through an HMI in one form of the present disclosure.

FIG. 6 is a diagram for illustrating a specific example of receiving confirmation on whether an accident has occurred from a user through an HMI in some forms of the present disclosure.

As shown, letters "Accident report completed", "N minutes left until cancellation", "Cancel" are displayed on the HMI 440, and the accident report cancel button 450 in which an X-marked figure is drawn may be displayed above the letters "Cancel".

In one example, the letters of the "Accident reception completed", the "N minutes left until cancellation", and the "Cancel" are only one example. The HMI 440 may display a message indicating that it is determined that the accident of the personal mobility has occurred, and the accident has been reported, a message indicating how much time is left to cancel the report of the accident, a button to cancel the accident report, and a phrase indicating the cancellation.

For example, the HMI 440 may transmit a message through a graphic or an image containing at least one of an icon or a figure other than the letter.

In the shown drawing, when the accident report cancel button 450 in which the X-marked figure is drawn is pressed, an electrical signal may be transmitted directly or indirectly to the determination device 120. The personal mobility accident determining device 100 may determine that the personal mobility accident determination through the determination device 120 is wrong, and may re-determine that the accident has not occurred.

Figure 7:
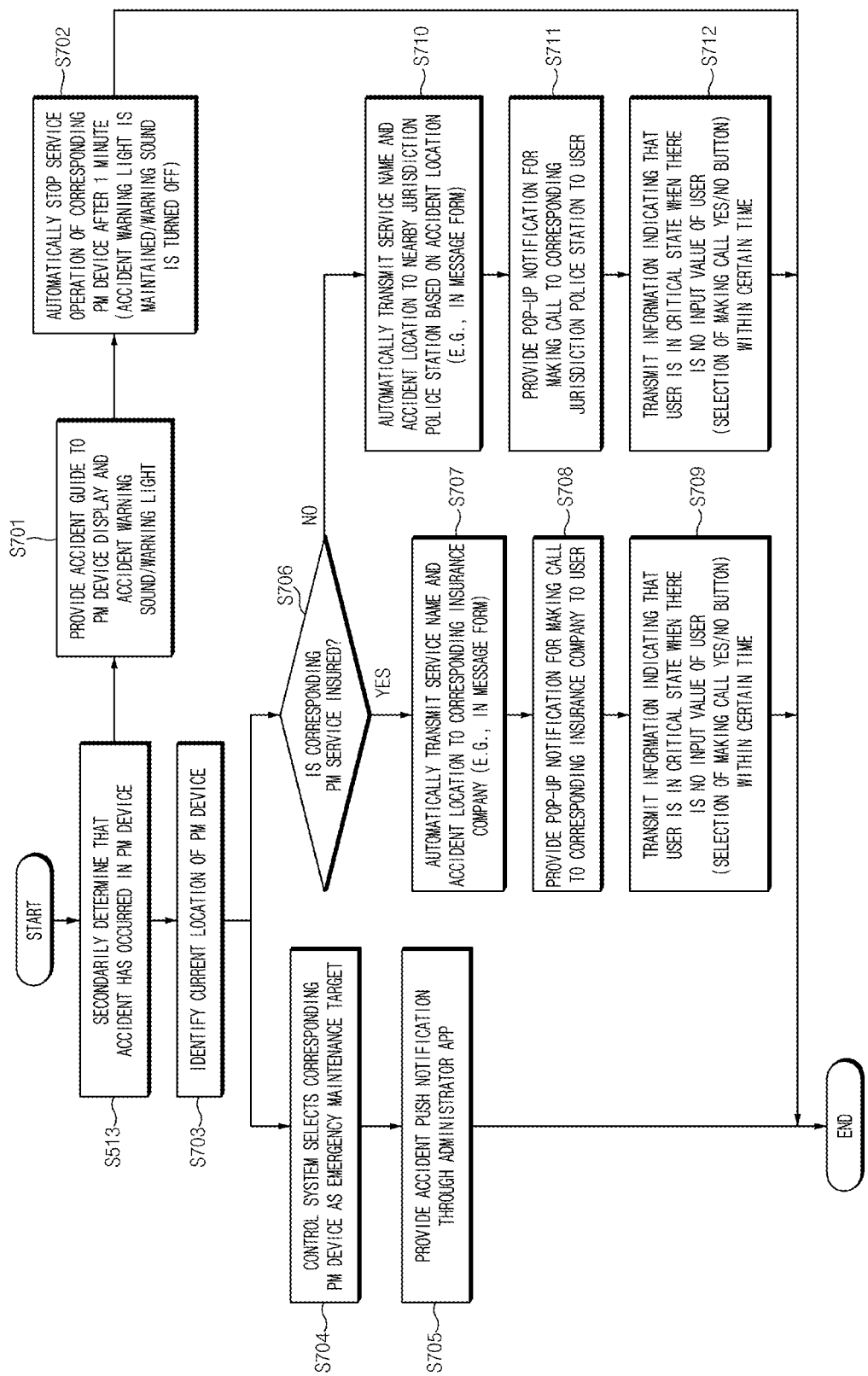
FIG. 7 is a flowchart illustrating a process of coping with an accident of personal mobility in one form of the present disclosure.

FIG. 7 is a flowchart illustrating a process of coping with an accident of personal mobility in some forms of the present disclosure.

To prevent a secondary accident, the personal mobility accident determining device 100 may provide accident warning sound/warning light through the sound/light 430, and may provide the accident guide through a display (S701).

The display on which the accident guidance is provided may be implemented as a screen on the HMI 440.

The personal mobility accident determining device 100 may provide the accident guidance and the warning sound/warning light, and automatically stop the service operation of the corresponding personal mobility device after 1 minute (S702).

The personal mobility accident determining device 100 may control the warning light to be maintained and the warning sound to be turned off 1 minute after providing the warning sound/warning light.

The personal mobility accident determining device 100 may identify the current location of the personal mobility device through the GPS device 210 (S703).

When it is determined that the accident has occurred in the personal mobility accident determining device 100, the personal mobility accident real-time notification system 200 may select the corresponding personal mobility device as the emergency maintenance target through the control system 240 (S704).

When it is determined that the accident has occurred in the personal mobility accident determining device 100, the personal mobility accident real-time notification system 200 may display the accident push notification through the administrator application 220 (S705).

Content of the accident push notification may include at least one of the information obtained by determining the accident or the location information of the personal mobility.

The personal mobility accident real-time notification system 200 may determine whether the corresponding personal mobility service is insured (S706).

The personal mobility accident real-time notification system 200 may determine whether the corresponding personal mobility service is insured through the control system 240 or the administrator application 220.

When the corresponding personal mobility service is insured, the personal mobility accident real-time notification system 200 may automatically transmit a service name and an accident location to the corresponding insurance company (S707).

The personal mobility accident real-time notification system 200 may automatically transmit the service name and the accident location to the corresponding insurance company in a form of a message.

The personal mobility accident real-time notification system 200 may provide the pop-up notification for making the call to the corresponding insurance company to the user through the user application 230 (S708).

When there is no input value of the user within a certain time after providing the pop-up notification for making the call to the corresponding insurance company, the personal mobility accident real-time notification system 200 may transmit information indicating that the user is in danger to the corresponding insurance company (S709).

The input value of the user may be implemented in a form of selecting a making a call yes/no button.

A. When the corresponding personal mobility service is not insured, the personal mobility accident real-time notification system 200 may automatically transmit the service name and the accident location to a nearby jurisdiction police station based on the accident location (S710).

The personal mobility accident real-time notification system 200 may automatically transmit the service name and the accident location to the corresponding police station in the form of the message.

The personal mobility accident real-time notification system 200 may provide the pop-up notification for making the call to the corresponding police station to the user through the user application 230 (S711).

When there is no input value of the user within the certain time after providing the pop-up notification for making the call to the corresponding police station, the personal mobility accident real-time notification system 200 may transmit the information indicating that the user is in danger to the corresponding police station (S712).

The input value of the user may be implemented in the form of selecting the making the call yes/no button.

Figure 8:
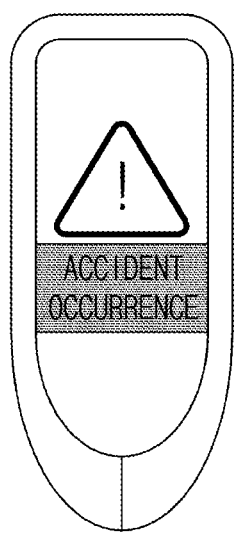
FIG. 8 is a diagram for illustrating an accident guide displayed on a display of personal mobility in one form of the present disclosure.

FIG. 8 is a diagram for illustrating an accident guide displayed on a display of personal mobility in some forms of the present disclosure.

As shown, an icon indicating a warning or caution may be displayed on the HMI 440 along with letters "accident occurrence". The letters "accident occurrence" may be displayed in light colored letters in dark shades to emphasize a meaning, and the icon indicating the warning or the caution may also be displayed in yellow or red to emphasize a meaning thereof.

In one example, the display of the HMI 440 may display other letters indicating the occurrence of the accident of the personal mobility instead of the letters "accident occurrence". In addition, the display of the HMI 440 may display a graphic that transmits a warning or caution message even though the graphic is different from the shown figure.

At the same time as the guide for the accident is displayed on the display of the HMI 440, the determination device 120 may output at least one of the warning sound or the warning light through the sound/light 430.

Figure 9:
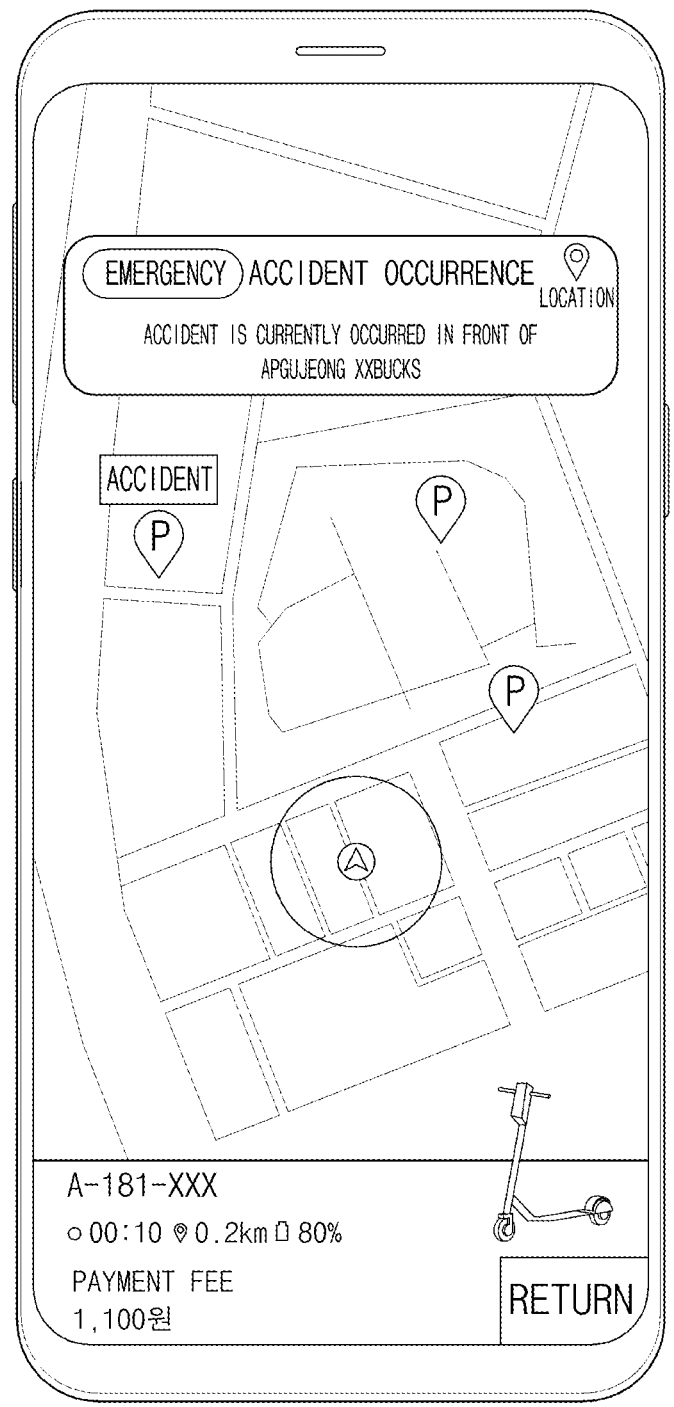
FIG. 9 is a diagram for illustrating a specific example of displaying a notification on an accident occurrence and a location through an administrator application in one form of the present disclosure.

FIG. 9 is a diagram for illustrating a specific example of displaying a notification on an accident occurrence and a location through an administrator application in some forms of the present disclosure.

As shown, a map may be displayed on the administrator application 220 operating on the communication terminal, and a push notification may be displayed at a top. The push notification may be displayed in content of "emergency, accident occurrence", and "An accident is currently occurred in front of Apgujeong xxbucks". At the same time, the administrator application 220 may display a location of the corresponding personal mobility where the accident has occurred on the map.

In one example, the phrases "emergency, accident occurrence" and "An accident is currently occurred in front of Apgujeong xxbucks." are only an example. The administrator application 220 may also display other phrases that transmit information on the accident occurrence and the location of the accident.

The administrator application 220 may also display other personal mobility devices provided with the personal mobility service in addition to the personal mobility which had the accident on the map.

For example, the administrator application 220 may display at least one of a used time of the personal mobility, a distance traveled while being used, a remaining battery capacity, a cost resulted from service use, or a button for terminating the service of the personal mobility.

For example, the administrator application 220 may display a location button in the push notification of the accident occurrence together. When the location button is pressed, the administrator application 220 may display the location of the personal mobility at which the accident has occurred on the map, and move the location of the corresponding personal mobility to a top of the map.

Figure 10:
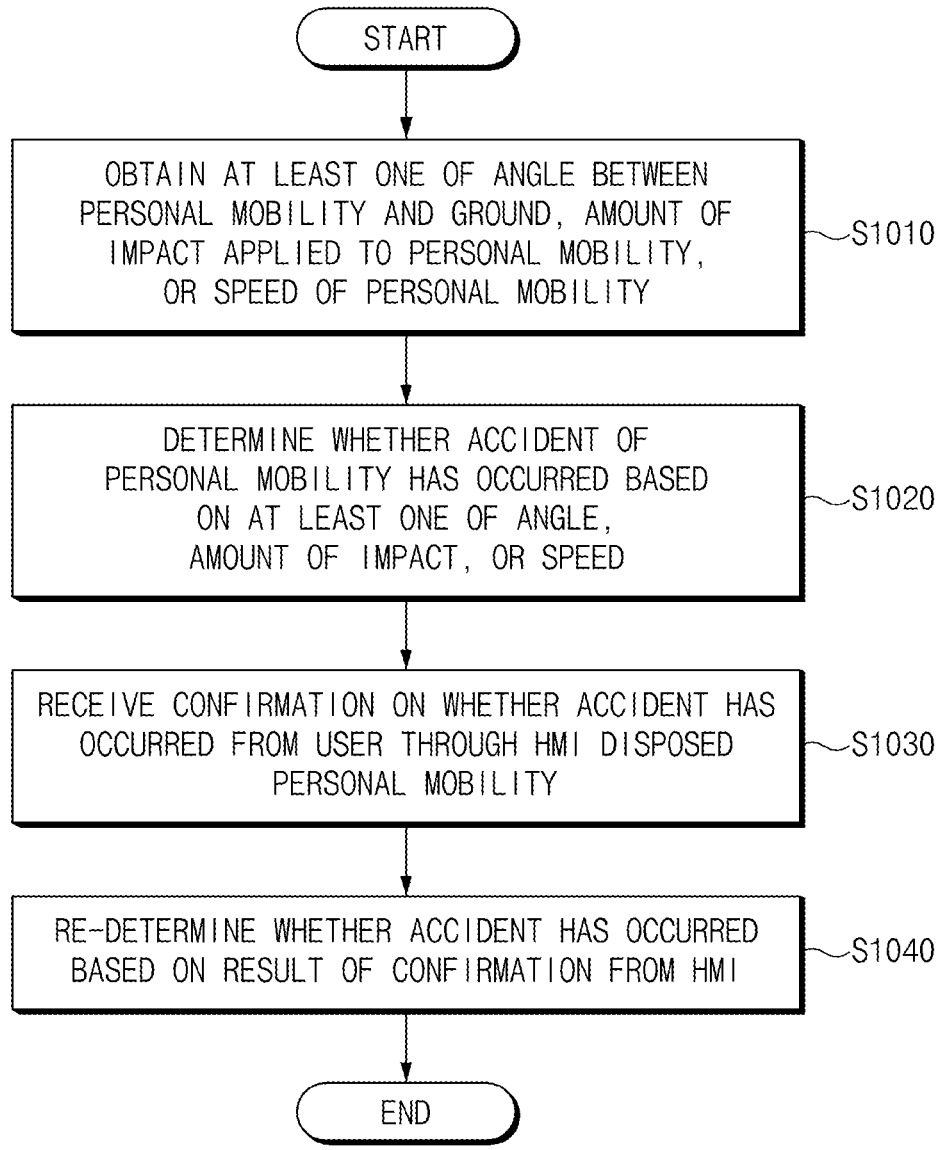
FIG. 10 is a flowchart of a method for determining a personal mobility accident in one form of the present disclosure.

FIG. 10 is a flowchart of a method for determining a personal mobility accident in some forms of the present disclosure.

The method for determining the personal mobility accident may include obtaining at least one of the angle between the personal mobility and the ground, the amount of impact on the personal mobility, or the speed of the personal mobility (S1010).

For example, the angle between the personal mobility and the ground may be obtained through at least one of the gyro sensor 310 or the 3-axis acceleration sensor 340.

For example, the amount of impact on the personal mobility may be obtained through the impact sensor 320.

For example, the speed of the personal mobility may be obtained through at least one of the power cutoff sensor 330 or the 3-axis acceleration sensor 340.

The method for determining the personal mobility accident may include obtaining at least one of the angle, the amount of impact, or the speed, and then, determining whether the accident of the personal mobility has occurred based on at least one of the angle, the amount of impact, or the speed (S1020).

For example, when the angle between the personal mobility and the ground corresponds to the range of being determined to be horizontal with each other, when the angle is maintained for a certain time or more, and when the amount of impact on the personal mobility is equal to or higher than the certain level, the determination device 120 may determine that the accident of the personal mobility has occurred.

The method for determining the personal mobility accident may include determining whether the accident of the personal mobility has occurred, and then, receiving the confirmation on whether the accident has occurred from the user through the HMI 440 disposed in the personal mobility (S1030).

For example, the HMI 440 may determine whether the accident has occurred by displaying the message indicating that the accident report has been completed on the display, indicating how much time is left until the accident report cancellation, and determining whether the accident report cancel button 450 is pressed.

The method for determining the personal mobility accident may include receiving the confirmation on whether the accident has occurred, and then, re-determining whether the accident has occurred based on the result of the confirmation from the HMI 440 (S1040).

For example, the determination device 120 may re-determine that the accident has not occurred when the user presses the accident report cancel button 450 within the certain time, and may re-determine that the accident has occurred when the user does not press the accident report cancel button 450 within the certain time.

Therefore, the exemplary forms of the present disclosure are provided to explain the spirit and scope of the present disclosure, but not to limit them, so that the spirit and scope of the present disclosure is not limited by some forms of the present disclosure. The scope of the present disclosure should be construed on the basis of the accompanying claims, and all the technical ideas within the scope equivalent to the claims should be included in the scope of the present disclosure.

Effects of the device for determining the accident of the personal mobility, the system including the same, and the method for determining the accident of the personal mobility according to the present disclosure will be described as follows.

In some forms of the present disclosure, the speed, the tilt, and the impact of the personal mobility may be sensed to determine the accident of the personal mobility.

In addition, in some forms of the present disclosure, whether the brake of the personal mobility is operating may be determined to determine the degree of the accident.

In addition, in some forms of the present disclosure, whether the accident of the personal mobility has occurred may be determined and the intention of the user about the accident may be reflected through the human machine interface (HMI).

In addition, in some forms of the present disclosure, whether the accident of the personal mobility has occurred may be determined, the at least one of the alarm or the accident guide may be output when it is determined that the accident has occurred, and the driving of the personal mobility may be stopped after the certain period of time.

In addition, in some forms of the present disclosure, the accident of the personal mobility may be determined, the personal mobility may be selected as the emergency maintenance target when it is determined that the accident has occurred, and the at least one of the accident of the personal mobility or the location of the personal mobility may be displayed on the administrator application.

In addition, in some forms of the present disclosure, the accident of the personal mobility may be determined, and the information of the at least one of the accident of the personal mobility or the location of the personal mobility may be provided to the at least one of the insurance company or the police station when it is determined that the accident has occurred.

In addition, in some forms of the present disclosure, the accident of the personal mobility may be determined, the pop-up notification for making the call to the insurance company or the police station may be provided on the user application, and the insurance company or the police station may be automatically notified that the user is in danger when there is no response to the pop-up notification.

In addition, various effects that are directly or indirectly identified through this document may be provided.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for determining an accident of personal mobility, the device comprising:
   a sensor device disposed in the personal mobility and configured to obtain at least one of an angle between the personal mobility and a ground, an amount of impact on the personal mobility, or a speed of the personal mobility; and a determination device configured to determine whether the accident of the personal mobility has occurred based on the at least one of the angle, the amount of impact, or the speed, wherein the determination device is configured to:
  determine whether the amount of impact equal to or higher than a predetermined level is sensed at a handle of a head of the personal mobility within a horizontal range, based on the angle between the personal mobility and the ground within a first reference time,
  perform a first determination that the accident has occurred in the personal mobility, based on the amount of impact equal to or higher than the predetermined level is sensed at the handle of the head of the personal mobility within the horizontal range,
  perform an automatic accident report response to the first determination, and
  perform a second determination that the accident has occurred in the personal mobility, based on failure to cancel the automatic accident report within a second reference time.

2. The device of claim 1, wherein the determination device is configured to determine whether the personal mobility is operating based on the speed.

3. The device of claim 1, wherein the determination device is configured to:
  determine whether the personal mobility is in a stationary state based on a decrease degree of the speed; and
  determine whether the accident has occurred based on a determination result.

4. The device of claim 1, wherein the determination device is configured to:
  determine whether the accident has occurred based on whether the personal mobility and the ground fall within the horizontal range.

5. The device of claim 1, wherein the sensor device is configured to determine whether a brake of the personal mobility is operating, and the determination device is configured to determine a degree of the accident based on whether the brake is operating.

6. The device of claim 1, further comprising:
  a human machine interface (HMI) disposed in the personal mobility and configured to receive, from a user, confirmation on whether the accident has occurred,
  wherein the determination device is configured to re-determine whether the accident has occurred based on a confirmation result from the HMI.

7. The device of claim 1, wherein the determination device is disposed in the personal mobility, and configured to output at least one of an alarm or a guide for the accident displayed on a display of the personal mobility when it is determined that the accident of the personal mobility has occurred.

8. The device of claim 7, wherein the determination device is configured to stop driving of the personal mobility when a predetermined amount of time elapses after outputting the at least one of the alarm or the guide for the accident.

9. A system for notifying an accident of personal mobility in real-time, the system comprising:
  a personal mobility accident determining device configured to determine the accident of the personal mobility based on at least one of an angle between the personal mobility and a ground, an amount of impact on the personal mobility, or a speed of the personal mobility; and a controller configured to select the personal mobility as an emergency maintenance target when it is determined that the accident has occurred in the personal mobility accident determining device,
  wherein the personal mobility accident determining device is configured to:
    determine whether the amount of impact equal to or higher than a predetermined level is sensed at a handle of a head of the personal mobility within a horizontal range, based on the angle between the personal mobility and the ground within a first reference time,
    perform a first determination that the accident has occurred in the personal mobility, based on the amount of impact equal to or higher than the predetermined level is sensed at the handle of the head of the personal mobility within the horizontal range,
    perform an automatic accident report response to the first determination, and
    perform a second determination that the accident has occurred in the personal mobility, based on failure to cancel the automatic accident report within a second reference time.

10. The system of claim 9, further comprising:
  a global positioning system (GPS) device disposed in the personal mobility and configured to obtain location information of the personal mobility; and
  an administrator application configured to display a notification of a content including at least one of information determining the accident or the location information when it is determined that the accident has occurred.

11. The system of claim 9, further comprising:
  a global positioning system (GPS) device disposed in the personal mobility and configured to obtain location information of the personal mobility,
  wherein the controller is configured to provide, to at least one of an insurance company or a police station, at least one of information determining the accident or the location information when it is determined that the accident has occurred.

12. The system of claim 11, further comprising:
  a user application configured to provide a pop-up notification for making a call to the insurance company or the police station when it is determined that the accident has occurred,
  wherein the controller is configured to provide, to at least one of the insurance company or the police station, information indicating that a user is in danger when the user does not respond to the pop-up notification for a predetermined amount of time.

13. A method for determining an accident of personal mobility, the method comprising:
  obtaining at least one of an angle between the personal mobility and a ground, an amount of impact on the personal mobility, or a speed of the personal mobility;
  determining whether the accident of the personal mobility has occurred based on the at least one of the angle, the amount of impact, or the speed;
  determining whether the amount of impact equal to or higher than a predetermined level is sensed at a handle of a head of the personal mobility within a horizontal range, based on the angle between the personal mobility and the ground within a first reference time;
  performing a first determination that the accident has occurred in the personal mobility, based on the amount of impact equal to or higher than the predetermined level is sensed at the handle of the head of the personal mobility within the horizontal range;

performing an automatic accident report response to the first determination;

performing a second determination that the accident has occurred in the personal mobility, based on failure to cancel the automatic accident report within a second reference time;

receiving, from a user, confirmation on whether the accident has occurred through a human machine interface (HMI) disposed in the personal mobility; and re-determining whether the accident has occurred based on a confirmation result from the HMI.

14. The method of claim 13, further comprising:

outputting at least one of an alarm or a guide for the accident displayed on a display of the personal mobility when it is determined that the accident of the personal mobility has occurred; and stopping driving of the personal mobility when a predetermined amount of time elapses after outputting the at least one of the alarm or the guide for the accident.

15. The method of claim 13, further comprising:

obtaining location information of the personal mobility; and providing, to at least one of an insurance company or a police station, at least one of information determining the accident or the location information when it is determined that the accident has occurred.

* * * * *